March 31, 1970  C. E. STROMSWOLD ET AL  3,504,352

TIME COMPRESSION SYSTEM

Filed May 24, 1968

INVENTORS
CHESTER E. STROMSWOLD
BARRY N. GLASS

BY [signature]

ATTORNEY

United States Patent Office 3,504,352
Patented Mar. 31, 1970

3,504,352
TIME COMPRESSION SYSTEM
Chester E. Stromswold and Barry N. Glass, Nashua, N.H., assignors to Sanders Associates, Inc., Nashua, N.H., a corporation of Delaware
Filed May 24, 1968, Ser. No. 731,818
Int. Cl. G11c 7/00, 21/00; H04b
U.S. Cl. 340—173
13 Claims

ABSTRACT OF THE DISCLOSURE

A time compression system storing periodic samples of a signal in an analog memory stores the samples at one rate and then retrieves them from the memory at a faster rate. The timing of the samples is changed from one sampling cycle to the next sampling cycle to avoid synchronizing the samples with the signal component whose frequency is the first subharmonic of the sampling rate. Also, the stray capacitances in the system are discharged prior to the storage of each sample to ensure that the recorded value of the sample is unaffected by the values of prior samples. For a similar reason, the stray capacitances are discharged prior to the retrieval of each sample from the memory.

BACKGROUND OF THE INVENTION

Field of the invention

This invention relates to a time compression system of the type used to compress a signal into a shorter time interval preparatory to analysis or other process of the signal. More particularly, it relates to a system using a set of storage elements to store sequentially a succession of periodic samples of an input signal taken over a predetermined interval. The contents of the storage elements are then successively sensed over a shorter interval, thereby compressing the signal into this latter interval.

Description of the prior art

Although certain features of the invention apply to time compression systems generally, the system to which the invention is specifically directed is one in which the storage elements are capacitors. In one conventional arrangement the storage capacitors have a common terminal connected to a terminal of the signal source. The opposite terminals of the capacitors are connected in succession to the other terminal of the signal source by a switching network when samples are to be read into the memory. The procedure is followed when the samples are retrieved from the memory, with the switching network then operating at a faster rate to provide the desired time compression.

Theoretically, a sampling rate that is twice the highest frequency component of significance should suffice to reproduce a signal with reasonable fidelity. In practice, however, the accuracy of reproduction leaves much to be desired. One might propose to improve fidelity by increasing sampling rate, but an increase is unfeasible when a higher sampling frequency is beyond the capability of the system or a large cost increase must be incurred. And even an increase in the sampling rate will not suffice in some applications.

SUMMARY AND OBJECTS OF THE INVENTION

Accordingly, an object of this invention is to improve the quality of reproduction in a time compression system without increasing the sampling rate.

A further object of the invention is to provide improved quality without an undue increase in cost.

Another object is to provide improved quality of reproduction in a compression system using capacitors as storage elements.

Other objects of the invention will in part be obvious and will in part appear hereinafter.

The invention accordingly comprises the features of construction, combination of elements, and arrangement of parts which will be exemplified in the constructions hereinafter set forth, and the scope of the invention will be indicated in the claims.

We have discovered two factors that adversely affect the quality of reproduction in a time compression system. The first of these is synchronism between sampling and the signal components whose frequencies are approximately one-half the sampling frequency, i.e. the first subharmonic of the sampling frequency. Each time one of these components is sampled, the recorded magnitude is the same (approximately the same for components that are not exactly one-half the sampling frequency). The sampling therefore does not in general provide a true picture of the amplitudes of these components. For example, if the sampling coincides with the axis crossings of one of these components, an absence of the component will be recorded even though it may actually have a very substantial amplitude.

We overcome this problem by interlacing the samplings during alternate sampling sequences. That is, the timing of the samples taken during each sequence relative to a clock is different from the timing of the samples taken during the preceding interval. In the simplest embodiment of this concept, the samples in each sequence are taken midway between successive samples of the preceding sequence. The timing of samples in all even-numbered sequences is therefore the same, and the timing for all odd-numbered sequences is displaced from that of the even-numbered sequences by one-half the sampling period. This permits the use of only two timing sequences, with a circuit having little more complexity than a conventional system using a single timing sequence for sampling.

We have also discovered that stray capacitance in the system adversely affects the quality of reproduction.

Each time a capacitor in the memory receives a charge during sampling of the incoming signal, the stray capacitance in the memory also receives a charge. When the next capacitor is connected to the signal source, the charge on the stray capacitance affects the charge stored in that capacitor. Each sample, therefore, is affected by previous samples and therefore is not an accurate representation of the signal at the time the sample is taken.

The same problem occurs when the samples are retrieved from the memory. As each capacitor is connected to the output device receiving the compressed signal, its voltage affects the charge on the stray capacitance. When the next capacitor is connected to the output device, the sensed voltage is affected by this charge and thus, again, each sample is affected by prior samples.

We eliminate the effect of stray capacitance by discharging this capacitance before each sample is recorded or retrieved from the memory. In this way the charge on the stray capacitance is at the same level prior to connection of each capacitor to the signal source or output device and therefore the recorded and retrieved values of each sample are independent of the values of preceding samples.

BRIEF DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENTS

Figure 1:
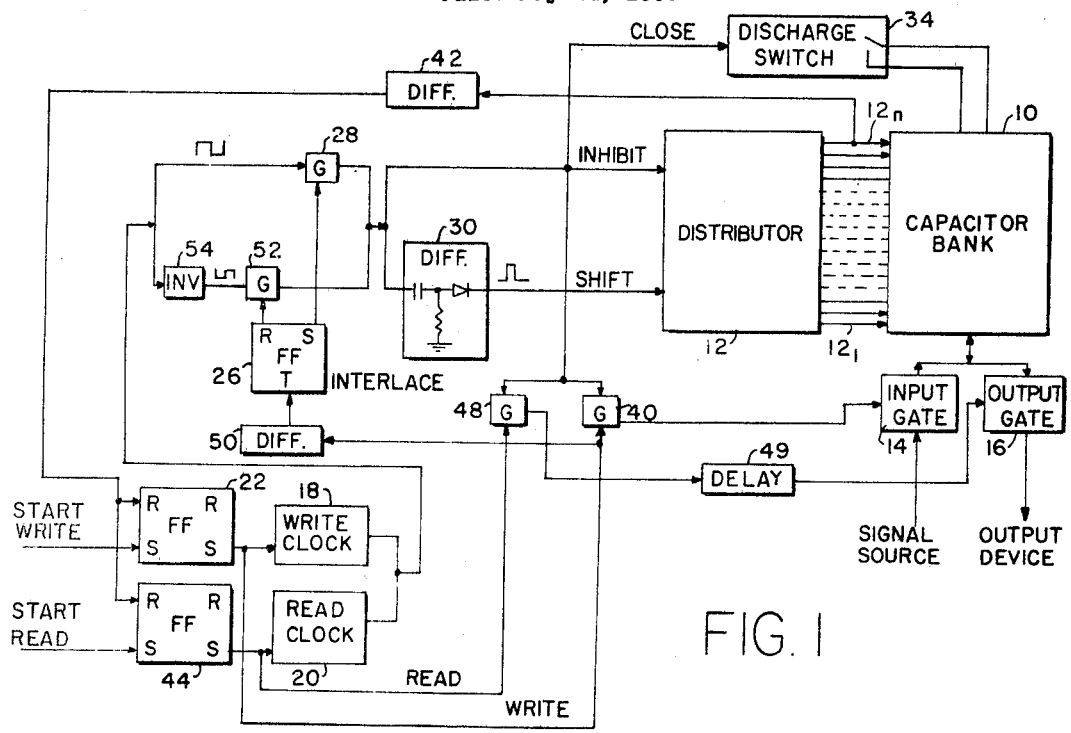
FIG. 1 is a schematic diagram of a time compression system incorporating the invention.

As shown in FIG. 1, our time compression system includes an analog memory in the form of a capacitor bank 10 containing a set of capacitors (not shown in FIG. 1) each of which stores a sample of an input signal from a signal source. A distributor 12 provides access to the individual storage capacitors in a predetermined sequence, so that the capacitor bank 10 can store successive input samples passed by an input gate 14 and later discharge the samples to an output device by way of an output gate 16. When the incoming information is being stored (i.e. during each write sequence) the system is under control of a write clock 18; and when the stored memory is being retrieved from the capacitor bank 10 (i.e. during each read sequence), the system is controlled by a read clock 20. The read clock 20 has a substantially higher frequency than the write clock 18 and the information is therefore retrieved from the capacitor bank 10 at a faster rate than it is fed to the capacitor bank, thereby effecting the desired compression function of the system.

As an example of the use to which the system may be put, one may employ it to display radar return signals in an interval that is relatively short compared to the interval during which they are received. Thus, upon transmission of a pulse by the radar, the time compression system can begin to store samples of the associated return signals and continue to store such samples over an interval corresponding to the range of the radar. During this interval, the cathode ray tube of the radar may be used to display background information such as a map of the area surrounding the radar.

Next, the radar display is switched to retrieve the signals stored in the time compression system and display such signals over a relatively short time interval. This cycle is then repeated for the next and succeeding transmissions. In this manner, the total content of the radar display can be greatly increased without materially decreasing the radar pulse repetition rate.

The storage of inforation in the time compression system begins in response to a start write signal and information retrieval is later initiated by a start read signal. When the system is used in connection with a radar as described above, the start write signal also initiates transmission by radar, and the start read signal also initiates display of the radar return signals.

In the system of FIG. 1, the start write signal sets a write flip-flop 22 whose output then turns on the write clock 18; the clock 18 thereupon provides a square-wave clock signal. Assuming that an interlace flip-flop 26 is in its set condition, the clock signal is passed by a gate 28 to a differentiator 30. The differentiator 30 and the other differentiators included in the circuit may be arranged to provide outputs only in response to voltage transitions in one direction, e.g. the positive-going transitions of the square wave applied to the differentiator 30, alternatively, the devices receiving the outputs of the differentiators may be arranged to respond only to pulses of one polarity.

The pulses from the differentiator 30 are applied to the SHIFT input of distributor 12 and after a short interval during which the distributor is inhibited, following each such pulse the distributor energizes a different one of its output terminals $12_1$–$12_n$. The terminal remains energized until the next pulse, after which time a succeeding terminal is energized. Each of the terminals $12_1$–$12_n$ is associated with a different capacitor in the capacitor bank 10, and whenever a terminal is energized, it provides access to its associated capacitor as described in detail below. Thus, a succession of pulses from the differentiator 30 causes the distributor 12 to energize in succession all of its terminals $12_n$ and thereby provide access, one at a time, to all of the capacitors in the bank 10.

Each positive clock pulse from the gate 28 inhibits the output of the distributor 12, so that during this interval, i.e. during the first half of each clock cycle, none of the terminals $12_1$–$12_n$ is energized and all of the capacitors in the bank 10 are isolated from the rest of the circuit. The positive clock pulses also close a switch 34 to discharge the stray capacitance in the capacitor bank 10. Each negative (or ground) clock pulse (i.e. during the second half of each clock cycle in the output of gate 28 is passed by a gate 40, enabled by the flip-flop 22. The output of the gate 40 enables the input gate 14 thereby connecting the signal source to the selected capacitor in the bank 10, i.e. the capacitor to which access has been provided by the distributor 12.

To recapitulate, the distributor 12 sequentially shifts its output to different terminals $12_1$–$12_n$ at the beginning of each clock cycle. However, this output is inhibited during the first half of the clock cycle, during which time the stray capacitance in the capaitor bank 10 is disharged. During the second half of the clock cycle, the selected distributor output terminal is energized, thereby providing access to a corresponding capacitor in the bank 10. At the same time, the input gate 14 is enabled so as to pass a signal sample to the selected capacitor.

The foregoing sequence continues, with successive capacitors in the bank 10 storing successive samples of the incoming signal, until the last of the capacitors has been selected. At this point, the last distributor terminal $12_n$ is energized and a differentiator 42 responds with a pulse resetting the flip-flop 22, thereby turning off the write clock 18. This cuts off the pulses from the gate 28 and differentiator 30 and the system is then quiescent until the stored information is to be retrieved from the capacitor bank 10.

Information retrieval is initiated by the start read signal which sets a read flip-flop 44 to turn on the read clock 20. The read clock signal is passed by the gate 28 and differentiated by the differentiator 30 as before. The distributor 12 thus provides access to the capacitors in the bank 10 in the same order as during the write sequence. The discharge switch 34 operates as before to discharge the stray capacitance during the first half of each clock cycle, while the distributor output is inhibited. During the second half of each clock cycle, however, the gate 40 is disabled and a gate 48 is enabled by the set output, READ line, of flip-flop 44 to pass the signal sample stored in the selected capacitor to the output device receiving the stored information.

Preferably, enabling of the gate 16 is delayed slightly by a delay element 49 to provide time for the stray capacitance in the capacitor bank 10 to attain equilibrium voltage with the selected storage capacitor after the latter capacitor has been connected into the circuit. Otherwise, the output device will be supplied with a voltage that varies during the interval in which the gate 16 is enabled and this will cause distortion of the compressed signal in some cases.

When the last capacitor in the bank 10 is selected during the read sequence, the differentiator 42 again provides an output pulse, which this time resets the flip-flop 44 to turn off the read clock 20. The system then waits for the next start write signal.

The next start writer signal initiates the write cycle, as described above. Also, by means of a differentiator 50 connected to the toggle input terminal of the interlace flip-flop 26, it causes the latter flip-flop to change state, i.e. to present a voltage at the reset output of flip-flop 26. This disables the gate 28 and enables a gate 52. The signal from the write clock 18 thus reaches the differentiator 30, switch 34, and gates 40 and 48 by way of an inverter 54. The clock signal from the gate 52 is thus displaced by one-half the period of the clock 18 with respect to the signal passed by the gate 28 during the previous write sequence. Assuming that the phase relationship between the write clock 18 and the incoming signal to be stored in the capacitor bank 10 is the same for successive write sequences, operation of the distributor 12, switch 34 and gate 40 is now displaced, relative to such operation during the previous write sequence; the signal samples stored in the capacitor bank are correspondingly displaced. As pointed out above, this eliminates distortion of the signal which might result from synchronism between signal sampling (at the frequency of the clock 18) and the signal component at half the sampling frequency.

During the succeeding read sequence, the gate 52 is still enabled and the samples are thus retrieved from the capacitor bank 10 at a time corresponding to the times when the respective samples were stored during the write cycle.

With the next start write signal, the setting of flip-flop 22 will cause the flip-flop 26 to change state again, thereby disabling the gate 52 and enabling the gate 28. The clock signal from the gate 28 is displaced in time with respect to the signal from the gate 52 during the second write sequence and it now coincides with the signal during the first write sequence. Thus, the timing of the clock signal applied to differentiator 30, switch 34 and gates 40 and 48 alternates on successive write sequences to provide the desired interlace function.

It should be noted that the signal samples displayed during each read sequence are visually interlaced with the samples displayed during the preceding and succeeding read sequences. In some respects this has the effect of doubling the signal sampling rate and the elimination of distortion discussed above may also be thought of as resulting from this effectively higher sampling rate.

In a radar system as described above, each sweep of the cathode ray tube displaying the stored contents of the time compression system must begin at the same time relative to the radar transmission from which the displayed information is derived. Otherwise, successive radar returns from the same target will be displayed at different range coordinates, thereby materially reducing the resolutions of the display. This means that the phase of the write clock 18 must be essentially fixed relative to the start write signal, the start read must have a fixed time relationship to the start write signal and the read clock 20 must have a fixed phase relationship with the start read signal. The timing of the start read signal is readily fixed by means of a clock or other suitable timing device in the radar system. The fixed relationship between the clocks 18 and 20 and the start write and start read signals are accomplished by incorporating into the clocks oscillators which always start at the same predetermined point in their wave form, e.g. a positive-going zero axis crossing. Such oscillators are well known and need not be described in detail here. For example, clocks of this type are described in the M.I.T. Radiation Laboratory Series, vol. 19, pp. 140–145.

Figure 2:
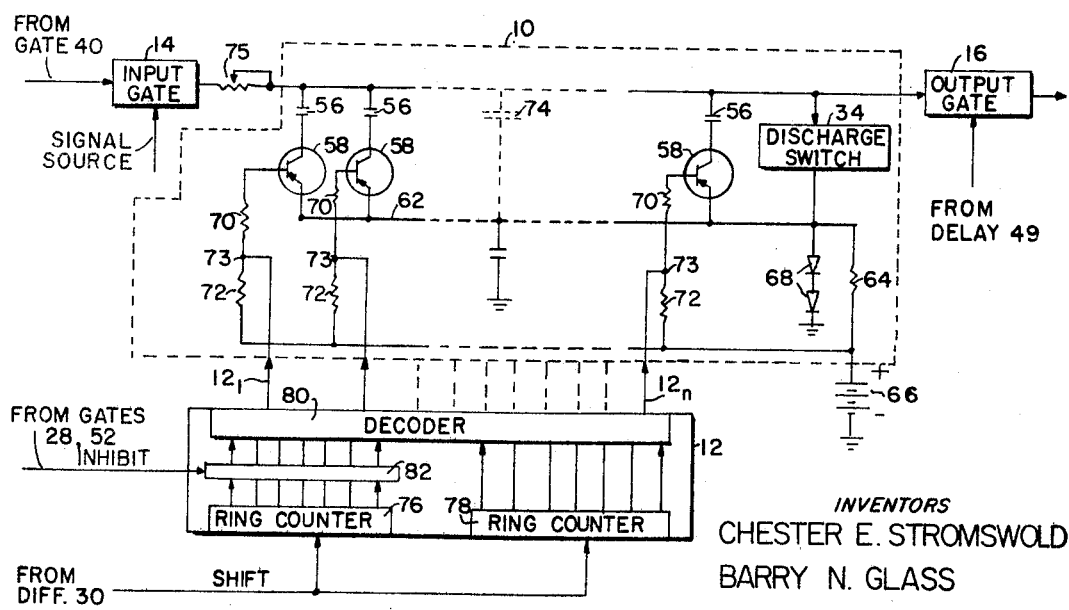
FIG. 2 is a more detailed schematic diagram of the capacitor bank and distributor incorporated in the system of FIG. 1.

As shown in FIG. 2, the capacitor bank 10 includes a set of storage capacitors 56, each of which is connected between a pair of busses 60 and 62, in series with the emitter-collector path of a transistor 58. The distributor 12 selects a capacitor 56 by turning on the associated transistor 58 and thereby effectively connecting the capacitor directly between the busses 60 and 62.

With further reference to FIG. 2, a resistor 64 is connected between the buss 62 and the positive terminal of a power supply illustrated as a battery 66. The buss 62 is maintained at a small positive potential by a series pair of forward conducting diodes 68. A pair of resistors 70 and 72 are connected in series between the base of each transistor 58 and the positive terminal of the battery 66. The junction 73 between each pair of resistors 70 and 72 is connected to one of the output terminals $12_1$–$12_n$ of the distributor 12.

The distributor output terminals which are not energized, i.e. not selected, are at a potential more positive than that of the buss 62. Therefore, the transistors 58 associated with these terminals have reverse-biased base-emitter junctions and consequently these transistors are turned off. The one distributor output terminal that is "energized" at any given time is at ground potential, thereby providing base-emitter current in the associated transistor 58 and turning on the emitter-collector conduction path of the transistor. This effectively connects the lower terminal of the corresponding capacitor 56 to the buss 62.

During the interval that the selected transistor 58 conducts, the input gate 14 may be enabled to apply the input signal voltage between the buss 60 and ground, thereby storing in the selected capacitor 56 a sample of the input signal. Similarly, if the output gate 16 is enabled during this interval, it will transfer to the output device the voltage between the upper terminal of the selected capacitor 56 and ground, thereby retrieving from the capacitor the signal sample stored therein.

The gates 14 and 16 preferably incorporate field-effect transistors to present high impedances to the capacitor bank 10.

The stray capacitance of the system is represented by the capacitor 74 in FIG. 2. Each time a signal sample is stored in one of the capacitors 56 during a write sequence, the capacitor 74 charges to a voltage corresponding to the voltage of the sample, since this capacitor is always connected between the busses 60 and 62. When the next sample is to be stored, the charge on the capacitor 74 will affect the content of the selected capacitor 56, assuming a finite output impedance for the gate 14. Thus, the content of each capacitor 56 will reflect not only the value of the sample to be stored in the capacitor, but also the values of preceding samples stored in other capacitors. The capacitor 74 causes a similar form of distortion during read sequences.

This problem is eliminated by discharging the capacitor 74 by means of the discharge switch 34 before each sample is stored in or retrieved from the capacitor bank 10, since in that case the capacitor cannot contribute to any sample the effect of preceding samples. The switch 34 may take the form of a transistor of the same type as the transistor 58, with its collector connected directly to the buss 60 and its emitter connected to the buss 62. Other form of an electronic switch may also be used, e.g. diodes, field effect transistors, silicon controlled rectifiers or vacuum tubes.

As described directly above, the use of the discharge technique eleminates integration "along the line," i.e. signal samples on a read-in or read-out sequence will not be influenced by stray capacitance. It is desirable in a radar display to perform a "line to line" integration in order to provide signal to noise ratio enhancement. Since each capacitor in the memory corresponds to a specific radial distance, "line to line" integration is affected by adjusting the charging time constant such that the capacitors do not charge fully on a single sample time. Thus the voltage on a capacitor represents a weighted average of voltage present during individual sweeps. Referring to FIG. 2, variable resistor 75 provides for adjustment of the "line to line" integration by varying the charging time constant. When resistor 75 is set to zero, the capacitor charges fully on one sample and there is no "line to line" integration.

As also shown in FIG. 2, the distributor 12 includes a pair of ring counters 76 and 78, and a decoder 80 connected to sense the conditions of the various stages in the two ring counters. The ring counters 76 and 78, both of which are shifted by pulses from the differentiator 30, have different numbers of stages. For example, they may have seventeen and nineteen stages respectively, in which case the counter 76 cycles through seventeen different conditions and the counter 78 cycles through nineteen different conditions in response to pulses from the differentiator 30. The number of combinations of conditions of the two counters is the product of the individual numbers, i.e. 323 in this example. The decoder 80 senses these separate combinations and energizes a different terminal $12_1$—$12_n$ for each combination.

A set of gates 82 interposed between the ring counter 76 and the decoder 80 is inhibited by the positive portion of each clock cycle, thereby cutting off one set of inputs to the decoder 80 and inhibiting the entire output thereof This isolates all the capacitors 56, as described above during operation of the discharge switch 34.

It will be apparent that one may make numerous modifications in the system without departing from the scope of the invention. For example, the distributor inhibiting function might be accomplished by injecting a positive voltage at the bases of all the transistors 58. Also, the differentiators can be eliminated if one uses the so-called J-K flip-flop in the ring counters and elsewhere in the system, since this flip-flop inherently responds only to transition in the square-wave signal from the clocks.

Also, the above described system may be used as a time expansion system by interchanging the frequencies of the write and read clocks respectively. Signals might be written-in at a higher rate and read-out at a slower rate thereby enabling the system to couple to a slower output device such as an electro-mechanical recorder or for magnification of a portion of the radar display.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

We claim:
1. In a time compression system of the type including
   (1) a memory bank comprising a set of storage elements,
   (2) clock means providing a clock signal, and
   (3) a distributor responsive to said clock signal to provide access to said storage elements one at a time, so as to
      (a) store in said elements a set of successive samples of an input signal, and
      (b) retrieve said samples in order from said storage elements,
   the improvement comprising
      (A) means for changing the timing of said access relative to said signal, thereby preventing continued synchronism of said samples with any signal component having a frequency of one-half the sample rate.

2. The system defined in claim 1 in which said time-changing means provides different timing for successive sets of signal samples.

3. The system defined in claim 1 in which said time-changing means provides the same relative timing for retrieval of a set of samples as for storage of the same set, thereby to accurately interlace successive sets of signal samples.

4. The system defined in claim 2 in which said time-changing means includes
   (A) means for inverting the output of said clock means thereby to provide an inverted clock signal displaced in phase from the uninverted clock signal, and
   (B) switching means alternately passing said inverted and uninverted clock signals to said distributor.

5. The system defined in calim 3 in which said time-changing means includes
   (A) means for inverting the output of said clock means thereby to provide an inverted clock signal displaced in phase from the uninverted clock signal, and
   (B) switching means for alternately passing said inverted and uninverted clock signals to said distributor.

6. The system defined in claim 1 in which said storage elements are capacitors.

7. The system defined in claim 6
   (A) in which said system includes a stray capacitance effectively in parallel with each capacitor to which access is made, and
   (B) including means for discharging said stray capacitance during intervals between access to the successive capacitors in said memory bank.

8. In a time compression system of the type including
   (1) a memory bank comprising a set of storage elements,
   (2) clock means providing a clock signal, and
   (3) a distributor responsive to said clock signal to provide access to said storage elements one at a time, so as to
      (a) store in said elements a set of successive samples of an input signal, and
      (b) retrieve said samples in order from said storage elements,
   the improvement comprising
      (A) means for discharging the stray capacitance in said memory bank during intervals between access to successive capacitors in said bank.

9. The system defined in claim 8 in which said discharge means comprises a switch connected so as to be in parallel with the selected capacitors in said bank.

10. The system defined in claim 8 including means for
    (A) inhibiting the output of said distributor during a portion of each clock period so as to isolate all said capacitors during said portion, and
    (B) actuating said discharge switch to discharge said stray capacitance during said portion.

11. The system defined in claim 10
    (A) including a pair of terminals,
    (B) in which each of said capacitors is connected in series with a selection switch between said terminals,
    (C) in which said distributor includes a set of output terminals one at a time in response to successive cycles of said clock signal, and
    (D) in which each selection switch is connected to one of said distributor terminals so as to be closed to provide access to the capacitor in series with the switch when that terminal is energized.

12. In a time compression system of the type including
    (1) a memory bank comprising a set of storage elements,
    (2) clock means providing a clock signal, and
    (3) a distributor responsive to said clock signal to provide access to said storage elements one at a time, so as to
       (a) store in said elements a set of successive samples of an input signal, and
       (b) retrieve said samples in order from said storage elements,
    the improvement comprising
       (A) means for changing the timing of said access relative to said signal, thereby preventing continued synchronism of said samples with any signal component having a frequency of one-half the sample rate,
       (B) means for discharging the stray capacitance in said memory bank during intervals between access to successive capacitors in said bank,
       (C) means for integrating successive input signals wherein each input signal is comprised of successive samples.

13. In a time expansion system of the type including
    (1) a memory bank comprising a set of storage elements,
    (2) clock means providing a clock signal, and
    (3) a distributor responsive to said clock signal to provide access to said storage elements one at a time, so as to
  (a) store in said elements a set of successive samples of an input signal, and
  (b) retrieve said samples in order from said storage elements,
the improvement comprising
  (A) means for changing the timing of said access relative to said signal, thereby preventing continued synchronism of said samples with any signal component having a frequency of one-half the sample rate,
  (B) means for discharging the stray capacitance in said memory bank during intervals between access to successive capacitors in said bank.

References Cited
UNITED STATES PATENTS 3,348,203  10/1967  Allen _____ 179—15.55

TERRELL W. FEARS, Primary Examiner

U.S. Cl. X.R.

179—15.55; 340—167